(12) United States Patent
Ueunten et al.

(10) Patent No.: US 8,928,305 B2
(45) Date of Patent: Jan. 6, 2015

(54) REFERENCE COMPENSATION MODULE AND SWITCHING REGULATOR CIRCUIT COMPRISING THE SAME

(71) Applicant: Monolithic Power Systems, Inc., San Jose, CA (US)

(72) Inventors: Paul Ueunten, San Jose, CA (US); Wangrui Guo, Chengdu (CN)

(73) Assignee: Monolithic Power Systems, Inc., San Jose, CA (US)

( * ) Notice: Subject to any disclaimer, the term of this patent is extended or adjusted under 35 U.S.C. 154(b) by 190 days.

(21) Appl. No.: 13/837,163

(22) Filed: Mar. 15, 2013

(65) Prior Publication Data

US 2014/0266092 A1    Sep. 18, 2014

(51) Int. Cl.
*G05F 3/16* (2006.01)
*H02M 3/158* (2006.01)
*G05F 1/46* (2006.01)
*H02M 1/00* (2006.01)

(52) U.S. Cl.
CPC ............... *H02M 3/158* (2013.01); *G05F 1/468* (2013.01); *H02M 2001/0025* (2013.01)
USPC ........................................................ 323/313

(58) Field of Classification Search
USPC ......... 323/234, 237, 265, 273–275, 281–285, 323/304, 311–317
See application file for complete search history.

(56) References Cited

U.S. PATENT DOCUMENTS

| 6,459,246 | B1 * | 10/2002 | Roo | 323/270 |
| 6,927,557 | B2 * | 8/2005 | Proll et al. | 323/312 |
| 2006/0176043 | A1 * | 8/2006 | Makino et al. | 323/312 |
| 2009/0160537 | A1 * | 6/2009 | Marinca | 327/539 |

\* cited by examiner

*Primary Examiner* — Adolf Berhane
*Assistant Examiner* — Jeffrey Gblende
(74) *Attorney, Agent, or Firm* — Perkins Coie, LLP

(57) ABSTRACT

A switching regulator circuit and a reference compensation module employed for compensating a reference signal in the switching regulator circuit. The switching regulator circuit with a reference ground having an average offset voltage referenced to a package ground pin, wherein the average offset voltage is proportional to an output current of the switching regulator circuit with a first factor. The reference compensation module may be configured to receive a second reference signal having a bandgap reference voltage with respect to the reference ground and a reference compensation signal proportional to the output current with a second factor, and configured to provide the first reference signal based on compensating the second reference signal with the reference compensation signal to substantially cancel out the average offset voltage from the first reference signal with respect to the ground pin.

19 Claims, 9 Drawing Sheets

REFERENCE COMPENSATION MODULE AND SWITCHING REGULATOR CIRCUIT COMPRISING THE SAME

TECHNICAL FIELD

This disclosure relates generally to power converters, and more particularly relates to switching regulators and reference compensation.

BACKGROUND

Switching regulators are widely used in various electronic devices for sourcing power to the electronic devices from a power source. The electronic device(s) powered by a switching regulator may be referred to as a load of the switching regulator. Generally, the switching regulator may be able to convert a power source voltage into an appropriate output voltage through controlling a switch module coupled to the power source voltage to switch on and off, thereby regulating power transmitted to the load.

The switching regulator generally comprises a control module for controlling the switch module so as to achieve good load regulation (load regulation may refer to change of the output voltage with an output current drawn by the load) based on a feedback signal indicative of the output voltage and a reference signal indicative of a desired value of the output voltage. However, the switch module, the control module and a module for providing the reference signal are generally fabricated on integrated circuit die(s) and encapsulated in a package. All the circuits and modules inside the package may be referred to as internal circuits and may be referenced to an internal reference ground, which is usually connected to a ground pin of the package via a resistive connecting component. During the switch module switching on and off periodically, a relatively large switching current (compared with currents flowing through other internal circuits of the switching regulator) may flow through the resistive component, resulting in an offset voltage from the reference ground to the package ground pin.

The offset voltage may change with the output current drawn by the load. If the output current increases, an average of the offset voltage (average offset voltage) increases as well. If the output current decreases, the average offset voltage also decreases. The reference signal with respect to the ground pin is thus influenced by the offset voltage, more concretely by the output current. Due to the reference signal changing with the output current, the load regulation performance of the switching regulator may decrease. For example, for a step down switching regulator, when the output current drawn by the load increases, the average offset voltage also increases, leading to decrease in the reference signal with respect to the ground pin. The decrease of the reference signal results in a smaller difference between the feedback voltage and the reference signal than should be without the decrease of the reference signal, which adversely worsen the load regulation.

A need therefore exists for solving the problem of influence of the offset voltage to the reference signal and the load regulation of a switching regulator circuit.

One existing solution provides a separate ground pin for the switch module, which is different from the ground pin used for the other circuits and modules of the switching regulator. Thus, the relative large current flowing through the switch module no longer flows through the ground pin used for other circuits and modules including the module for providing the reference signal. Therefore, the reference signal in this case is unaffected by the output current. However, this solution requires an additional ground pin, which increases cost and size of the switching regulator.

Another existing solution lies in reducing the parasitic resistance caused by the resistive connecting component (e.g. bondwire) between the internal reference ground and the package ground pin. This can be accomplished by Chip Scale or flip-chip bonding of the ground pin. However while resistance is reduced it is not insignificant. Moreover Chip Scale or flip-chip bonding connection is relatively expensive in area due to its low mechanical density with respect to a high density bondwire connection.

SUMMARY

In accomplishing the above and other objects, there has been provided, in accordance with an embodiment of the present disclosure, a switching regulator circuit, comprising: an input port configured to receive a power source voltage; an output port configured to provide an output voltage and an output current; a reference ground connected to a package ground pin via a resistive component, wherein the reference ground has an average offset voltage with respect to the package ground pin, and wherein the average offset voltage is proportional to the output current with a first factor; a switch module having a first terminal coupled to the input port, a second terminal coupled to the output port, a third terminal coupled to the reference ground, and a fourth terminal configured to receive a control signal, wherein the switch module is configured to switch on and off periodically in response to the control signal to convert the power source voltage into the output voltage; a control module configured to receive a first signal indicative of the output voltage and a first reference signal indicative of a desired output voltage value, and configured to provide the control signal to the switch module based on the first signal and the first reference signal; and a reference compensation module configured to receive a second reference signal having a bandgap reference voltage with respect to the reference ground and a reference compensation signal proportional to the output current with a second factor, and configured to provide the first reference signal based on compensating the second reference signal with the reference compensation signal to substantially cancel out the average offset voltage from the first reference signal with respect to the ground pin.

In addition, there has been provided, in accordance with an embodiment of the present disclosure, a reference compensation module for a switching regulator circuit, wherein the switching regulator circuit has a reference ground having an average offset voltage referred to a package ground pin, and wherein the average offset voltage is proportional to an output current of the switching regulator circuit with a first factor, and wherein the reference compensation module comprises: a first input terminal configured to receive a second reference signal having a bandgap reference voltage with respect to the reference ground; a second input terminal configured to receive a reference compensation signal proportional to the output current with a second factor; and an output terminal configured to provide a first reference signal based on compensating the second reference signal with the reference compensation signal to substantially cancel out the average offset voltage from the first reference signal with respect to the ground pin.

BRIEF DESCRIPTION OF THE DRAWINGS

The following detailed description of various embodiments of the present invention can best be understood when

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
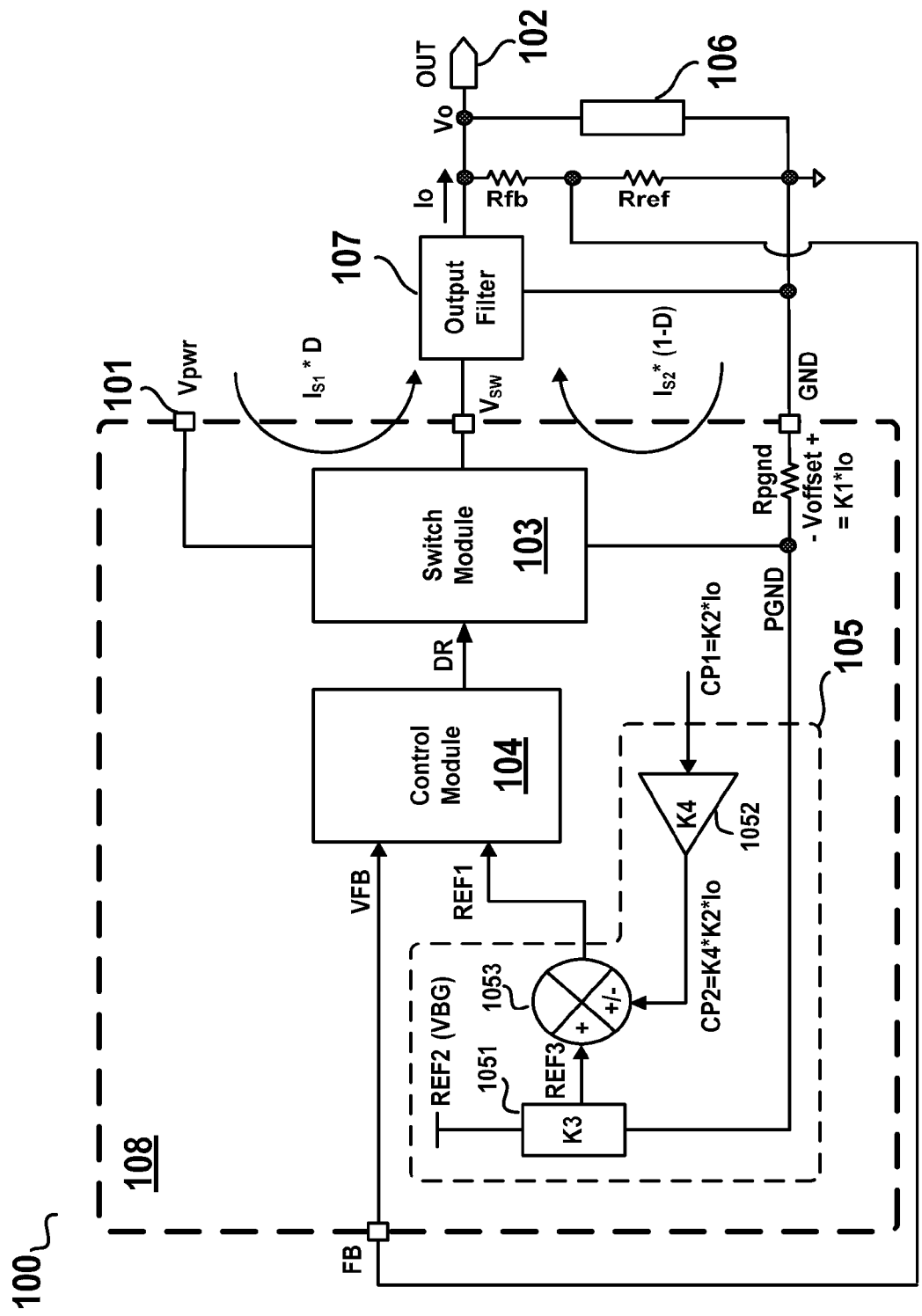
FIG. 1 illustrates a block diagram of a switching regulator circuit 100 in accordance with an embodiment of the present invention.

FIG. 1 illustrates a block diagram of a switching regulator circuit 100 in accordance with an embodiment of the present invention. The switching regulator circuit 100 is provided to source an output voltage Vo for supplying a load 106 from a power source voltage Vpwr. The power source voltage Vpwr may include a voltage provided by a system port, a voltage from a power source line or a voltage from an upstream circuit etc. The load 106 may comprise a downstream circuit or other electronic devices needing to be powered by the output voltage Vo.

The switching regulator circuit 100 may comprise an input port 101 configured to receive the power source voltage Vpwr; an output port 102 configured to provide the output voltage Vo and an output current Io for supplying the load 106; a switch module 103; a control module 104; and a reference compensation module 105. The switch module 103, the control module 104 and the reference compensation module 105 may be fabricated on a single circuit die or on separate circuit dies mounted on a leadframe and encapsulated in a package 108. The circuits and modules such as the switch module 103, the control module 104 and the reference compensation module 105 etc. encapsulated inside the package 108 are generally referred to as internal integrated circuits. The switching regulator circuit 100 may comprise a reference ground PGND connected to a package ground pin GND via a resistive component Rpgnd. The reference ground PGND functions as a ground for the internal integrated circuits encapsulated inside the package 108. The resistive component Rpgnd may refer to a connecting component such as bondwire, flipchip bump etc.

The switch module 103 of the switching regulator circuit 100 is provided for regulating power transmitted to the load 106 from the power source voltage Vpwr. In an exemplary embodiment, the switch module 103 may comprise a first terminal coupled to the input port 101, a second terminal coupled to the output port 102, a third terminal coupled to the reference ground PGND, and a fourth terminal configured to receive a control signal DR, wherein the switch module 103 is configured to switch on and off periodically in response to the control signal DR to convert the power source voltage Vpwr into the output voltage Vo. Therefore, the switch module 103 may achieve power regulation through regulating the output voltage Vo in response to the control signal DR. The switching on and off of the switch module 103 may be referred to as an operation cycle of the switching regulator circuit 100. In one embodiment, for example, the switch module 103 is configured to switch on for a first time duration in the operation cycle to enable a first switching current $I_{S1}$ flow through the switch module 103, and is further configured to switch off for a second time duration in the operation cycle to enable a second switching current $I_{S2}$ flow through the switch module 103. A fraction of time that the switch module 103 is switched on during the total time of the operation cycle (i.e. a percentage of the first time duration to the total time of the operation cycle) may be referred to as an on duty cycle of the switch module 103, denoted by D for example. According to an exemplary embodiment, the first switching current $I_{S1}$ and the second switching current $I_{S2}$ are enabled and disabled in complementary. The output current Io may refer to an average of the first switching current $I_{S1}$ and the second switching current $I_{S2}$ during the operation cycle. In one embodiment, the switch module 103 may comprise at least a controllable main switch (not shown in FIG. 1) that can be switched on and off in response to the control signal DR, wherein when the main switch is turned on, the switch module 103 is referred to as switch on, and when the main switch is turned off, the switch module 103 is referred to as switch off.

In the switching regulator circuit 100, either the first switching current $I_{S1}$ or the second switching current $I_{S2}$ flowing to the reference ground PGND and through the resistive component Rpgnd to the ground pin GND may result in an average offset voltage Voffset presenting between the internal reference ground PGND and the package ground pin GND, which is harmful to load regulation accuracy as mentioned in the background section of this disclosure. In the exemplary embodiment shown in FIG. 1, it is illustrated that the second switching current $I_{S2}$ flows through the resistive component Rpgnd and causes the average offset voltage Voffset. However, this is just for purpose of illustration and for better understanding of the embodiment, and should not be interpreted as limitations. In other embodiments, the first switching current $I_{S1}$ may flow through the resistive component Rpgnd, leading to the average offset voltage Voffset. The average offset voltage Voffset is proportional to an average value of the switching current (either the first switching current $I_{S1}$ or the second switching current $I_{S2}$) flowing through it, and thus may be further considered as proportional to the output current Io with a first factor K1. The first factor K1 may be substantially determined by the resistance of the resistive component Rpgnd and the on duty cycle D of the switch module 103. For example, the first factor K1 pertaining to the example embodiment shown in FIG. 1 may be expressed by K1 =Rpgnd*(1−D). In the following, the duty cycle (1−D) may be referred to as an off duty cycle of the switch module 103.

One having ordinary skill in the art should understand that the average offset voltage Voffset may be negative or positive with respect to the ground pin GND, depending on the flow direction of the switching current ($I_{S1}$ or $I_{S2}$) through the resistive component Rpgnd. If the switching current ($I_{S1}$ or $I_{S2}$) through the resistive component Rpgnd flows in the direction from the switch module 103 to the ground pin GND, the average offset voltage Voffset should be positive with respect to the ground pin GND, which indicates that the reference ground PGND is positive in voltage with respect to the ground pin GND. If the switching current ($I_{S1}$ or $I_{S2}$) through the resistive component Rpgnd flows in the direction from the ground pin GND to the switch module 103, the average offset voltage Voffset should be negative with respect to the ground pin GND, which indicates that the reference ground PGND is negative in voltage with respect to the ground pin GND. The voltage sense of the average offset voltage Voffset may be marked with the symbols "+" and "−" in the accompanying drawings of the present disclosure. In the example of FIG. 1, it is illustrated that the second switching current $I_{S2}$ flows in the direction from the ground pin GND to the switch module 103 resulting in the average offset voltage Voffset. Therefore, the average offset voltage Voffset should be negative with respect to the ground pin GND in this example. However, one having ordinary skill in the art should understand that this is just for purpose of illustration and for better understanding of the embodiment, and should not be interpreted as limitations.

The control module 104 of the switching regulator circuit 100 is provided for controlling the switch on and off of the switch module 103 to convert the power source voltage Vpwr to the output voltage Vo. In the exemplary embodiment of FIG. 1, the control module 104 is configured to receive a first signal VFB indicative of the output voltage Vo, and a first reference signal REF1 indicative of a desired value of the output voltage Vo. For example, the first signal VFB may be a scaled down voltage of the output voltage Vo, and the first reference signal REF1 may be a scaled down voltage of the desired output voltage value. Based on the first signal VFB and the first reference signal REF1, the control module 104 is further configured to provide the control signal DR to the control module 103 for controlling the switch on and off of the switch module 103.

In one embodiment, a feedback module is provided and configured to sense the output voltage Vo to generate the first signal VFB to a package feedback pin FB. The feedback module is exemplarily illustrated as to comprise a first feedback resistor Rfb and a second feedback resistor Rref coupled in series between the output port 102 and the ground pin GND, wherein the first feedback resistor Rfb and the second feedback resistor Rref has a common connection configured to provide the first signal VFB.

The reference compensation module 105 of the switching regulator circuit 100 is provided for compensating the influence of the average offset voltage Voffset to the first reference signal REF1 when referenced to the ground pin GND. In an exemplary embodiment, as illustrated in FIG. 1, the reference compensation module 105 is configured to receive a second reference signal REF2 and a reference compensation signal CP1, and to generate the first reference signal REF1 based on the second reference signal REF2 and the reference compensation signal CP1. The second reference signal REF2 may have a bandgap reference voltage VBG with respect to the reference ground PGND, and may be provided by a bandgap reference circuit which is well known to those skilled in the art. Since the average offset voltage Voffset is proportional to the output current Io with the first factor K1, the reference compensation signal CP1 may be proportional to the output current Io with a second factor K2 for example, then it may be feasible to use the reference compensation signal CP1 for compensating the influence of the average offset voltage Voffset to the first reference signal REF1 when referenced to the ground pin GND. The reference compensation signal CP1 may be provided by sensing and processing the first switching current $I_{S1}$, or the second switching current $I_{S2}$, or the output current Io, or may be provided by using any other signals in the switching regulator circuit 100 that can indicate the output current Io. However, this is just for naming a few examples and is not intended to be limiting. One having ordinary skill in the art will understand that there are many other ways to obtain the reference compensation signal CP1. In one embodiment, the reference compensation module 105 is configured to generate the first reference signal REF1 based on compensating the second reference signal REF2 with the reference compensation signal CP1 so as to substantially cancel out the average offset voltage Voffset from the first reference signal REF1 with respect to the ground pin GND.

To provide an example, in one embodiment, it may be desired that the first reference signal REF1 has a voltage value proportional to (including equivalent to) the bandgap reference voltage VBG with respect to the ground pin GND. In this case, the reference compensation module 105 may be configured to generate a third reference signal REF3 proportional to the second reference signal REF2 with a third factor K3, and to generate a second compensation signal CP2 proportional to the reference compensation signal CP1 with a fourth factor K4. The first reference signal REF1 may be provided by superposing the second compensation signal CP2 to the third reference signal REF3. The first reference signal REF1, when referenced to the ground pin GND, may then be expressed by the following expression:

$$REF1 = REF3 + Voffset \pm CP2 = K3*VBG + K1*Io \pm K4*K2*Io \quad (1)$$

Generally, the third factor K3 can be determined according to the desired value of the output voltage Vo and the ratio between the first signal VFB and the output voltage Vo. The operational symbol "±" in the expression (1) means that the superposing of the second compensation signal CP2 to the third reference signal REF3 may refer to addition or subtraction depending on the average offset voltage Voffset being negative or positive with respect to the ground pin GND. It can be seen from the expression (1) of REF1 that through appropriately choosing the second factor K2 and the fourth factor K4, the item K1*Io may be substantially cancelled out by the item K4*K2*Io, which means that the average offset voltage Voffset may be substantially cancelled out from the first reference signal REF1 by the reference compensation signal CP1 with respect to the ground pin GND. Thus, the influence of the average offset voltage Voffset to the first reference signal REF1 when referenced to the ground pin may be substantially eliminated or at least alleviated.

In one embodiment, the average offset voltage Voffset is negative with respect to the ground pin GND due to the switching current ($I_{S1}$ or $I_{S2}$) through the resistive component Rpgnd flowing in the direction from the ground pin GND to the switch module 103. In this case, the superposing of the second compensation signal CP2 to the third reference signal REF3 refers to addition. That is to say, the reference compensation module 105 is configured to add the second compensation signal CP2 to the third reference signal REF3 to generate the first reference signal REF1 in this situation. One having ordinary skill in the art can set the second factor K2 and the fourth factor K4 appropriately so as to cancel out the item K1*Io by the item K4*K2*Io in the expression (1) of the first reference signal REF1, thereby substantially cancelling out the influence of the average offset voltage Voffset to the first reference signal REF1 by the reference compensation signal CP1 with respect to the ground pin GND.

In one embodiment, the average offset voltage Voffset is positive with respect to the ground pin GND due to the switching current ($I_{S1}$ or $I_{S2}$) through the resistive component Rpgnd flowing in the direction from the switch module 103 to the ground pin GND. In this case, the superposing of the second compensation signal CP2 to the third reference signal REF3 refers to subtraction. That is to say, the reference compensation module 105 is configured to subtract the second compensation signal CP2 from the third reference signal REF3 to generate the first reference signal REF1 in this situation. One having ordinary skill in the art can choose the second factor K2 and the fourth factor K4 appropriately so as to cancel out the item K1*Io by the item K4*K2*Io in the expression (1) of the first reference signal REF1, thereby substantially cancelling out the influence of the average offset voltage Voffset to the first reference signal REF1 by the reference compensation signal CP1 with respect to the ground pin GND.

In one embodiment, continuing with FIG. 1, the reference compensation module 105 may comprise a voltage dividing circuit 1051, a gain buffer 1052 and a superposing circuit 1053. The voltage dividing circuit 1051 may comprise a dividing input terminal configured to receive the second reference signal REF2, and the voltage dividing circuit 1051 is configured to divide the second reference signal REF2 with the third factor K3 so as to generate the third reference signal REF3 at a dividing output terminal. If it is desired that the first reference signal REF1 has the bandgap reference voltage VBG provided by the second reference signal REF2, which implies that the third factor K3 should be 1, the voltage dividing circuit 1051 may not be necessary and may be omitted. In this case, the second reference signal REF2 may be directly provided as the third reference signal REF3 to the superposing circuit 1053. The gain buffer 1052 may comprise a buffer input terminal configured to receive the reference compensation signal CP1 and to apply a gain K4 to the reference compensation signal CP1 so as to provide the second compensation signal CP2 at a buffer output terminal. The superposing circuit 1053 may comprise a first superposing input terminal, a second superposing input terminal, and a superposing output terminal, wherein the first superposing input terminal is configured to receive the third reference signal REF3, the second superposing input terminal is configured to receive the second compensation signal CP2, and the superposing circuit 1053 is configured to superpose the second compensation signal CP2 to the third reference signal REF3 to generate the first reference signal REF1 at the superposing output terminal. When the average offset voltage Voffset is negative with respect to the ground pin GND, the superposing of the second compensation signal CP2 to the third reference signal REF3 refers to addition. When the average offset voltage Voffset is positive with respect to the ground pin GND, the superposing of the second compensation signal CP2 to the third reference signal REF3 refers to subtraction.

Figure 2:
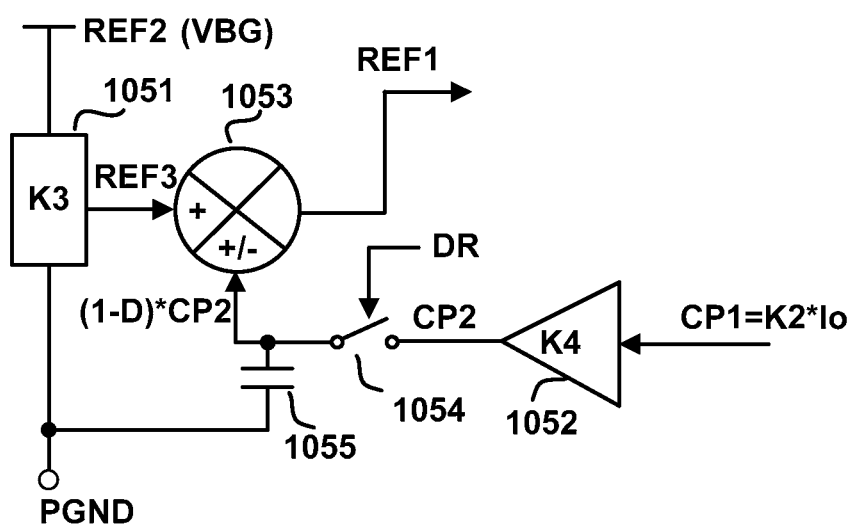
FIG. 2 illustrates a schematic diagram of a reference compensation module 105 according to an alternative exemplary embodiment of the present invention.

FIG. 2 illustrates a schematic diagram of a reference compensation module 105 that can be used in the switching regulator circuit 100 according to an alternative exemplary embodiment of the present invention. Components or structures in the reference compensation module 105 shown in FIG. 2 with substantially the same functions as those of the reference compensation module 105 shown in FIG. 1 are identified by the same reference labels for the sake of simplicity. In the exemplary embodiment as shown in FIG. 2, the reference compensation module 105 may further comprise a controllable pass device 1054. The pass device 1054 is coupled between the buffer output terminal of the gain buffer 1052 and the second superposing input terminal of the superposing circuit 1053, and is configured to transmit the second compensation signal CP2 to the second superposing input terminal of the superposing circuit 1053 during the period that the switching current (either the first switching current $I_{S1}$ or the second switching current $I_{S2}$) flowing through the resistive component Rpgnd is enabled through the switch module 103. The pass device 1054 in this exemplary embodiment enables the reference compensation signal CP1 to compensate the average offset voltage Voffset with the duty cycle Dor (1−D) information, which represents a percentage of time that the first switching current $I_{S1}$ or the second switching current $I_{S2}$ flowing through the resistive component Rpgnd is enabled in an operation cycle. Thus, the influence of the average offset voltage Voffset to the first reference signal REF1 may be more precisely compensated by the reference compensation signal CP1.

In one embodiment, the pass device 1054 may comprise a first switch terminal, a second switch terminal and a switch control terminal, wherein the first switch terminal is coupled to the buffer output terminal of the gain buffer 1052 to receive the second compensation signal CP2, the second switch terminal is coupled to the second superposing input terminal of the superposing circuit 1053, and the switch control terminal is configured to receive the control signal DR, wherein the control signal DR is configured to drive the pass device 1054 on in synchronous with driving the switch module 103 to enable the switching current ($I_{S1}$ or $I_{S2}$) flowing through the resistive component Rpgnd, and to drive the pass device 1054 off in synchronous with driving the switch module 103 to disable the switching current ($I_{S1}$ or $I_{S2}$) flowing through the resistive component Rpgnd.

Continuing with FIG. 2, in an exemplary embodiment, the reference compensation module 105 may optionally further comprise a noise filter (e.g. a capacitor) 1055 coupled between the second superposing input terminal of the superposing circuit 1053 and the reference ground PGND. The noise filter 1055 is configured to smooth the second compensation signal CP2 transmitted to the second superposing input terminal and may advantageously help to decrease the switching noise of the pass device 1054 transmitted to the superposing circuit 1053.

In an exemplary embodiment, referring back to FIG. 1, the switching regulator circuit 100 may further comprise an output filter module 107, which is provided for smoothing the output voltage Vo. For example, in the exemplary embodiment of FIG. 1, the output filter module 107 is coupled between the second terminal of the switch module 103 and the output port 102, and is configured to convert a switching voltage $V_{SW}$ provided by the switch module 103 into the output voltage Vo.

Figure 3:
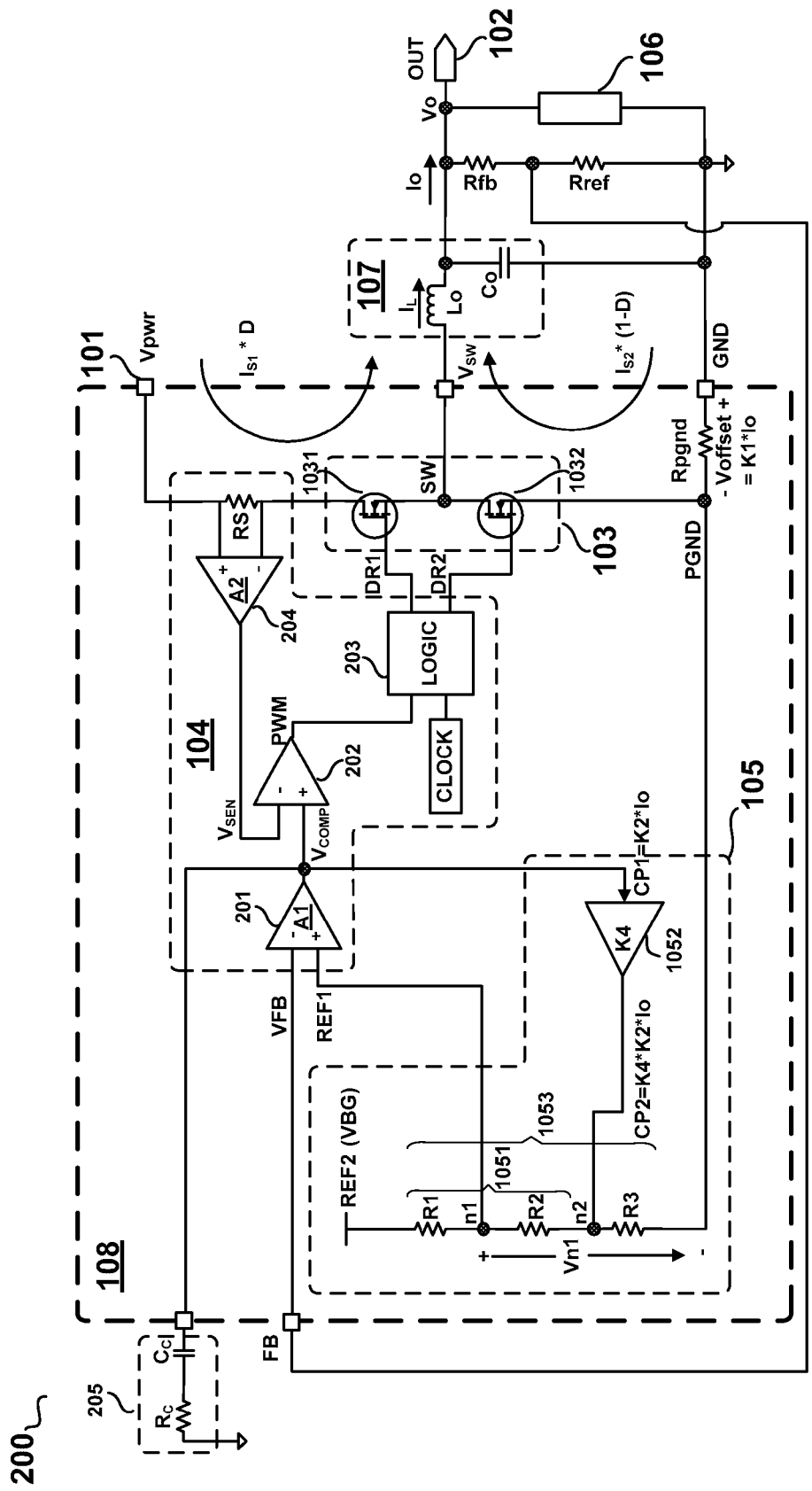
FIG. 3 illustrates a block diagram of a switching regulator circuit 200 in accordance with an embodiment of the present invention.

FIG. 3 illustrates a block diagram of a switching regulator circuit 200 in accordance with an embodiment of the present invention. Components or structures in the switching regulator circuit 200 with substantially the same functions as those of the switching regulator circuit 100 described previously with reference to FIGS. 1 and 2 are identified by the same reference labels for the sake of simplicity. In the exemplary embodiment as shown in FIG. 3, the switch module 103 is illustrated as to comprise a first switch 1031 (main switch) and a second switch 1032 coupled in series between the input port 101 and the reference ground PGND, wherein the first switch 1031 and the second switch 1032 have a common connection SW which is coupled to the output port 102 via the output filter module 107. The exemplary embodiment of the switching regulator circuit 200 shown in FIG. 2 is thus based on buck (step-down) type converter topology and may be referred to as a buck (step down) switching regulator circuit. In the example of FIG. 3, the first switch 1031 is illustrated as to comprise a MOSFET, while in other embodiments, the first switch 1031 may comprise other controllable switching device such as JFET, BJT, IGBT etc. Similarly, the second switch 1032 is also illustrated as to comprise a MOSFET. In other embodiments, the second switch 1032 may comprise other switching device, including controllable MOSFET, JFET, IGBT, freewheeling diode etc.

In the exemplary embodiment as shown in FIG. 3, the output filter module 107 is illustrated as an example to comprise an inductive power storage device Lo (e.g. an output inductor Lo) coupled between the common connection SW and the output port 102, and a capacitive power storage device Co (e.g. an output capacitor Co) coupled between the output port 102 and the package ground pin GND. In one embodiment, the capacitive power storage device Co may comprise an equivalent load capacitor of the load 106. In other embodiment, the capacitive power storage device Co may comprise other capacitive elements appropriately chosen.

In the exemplary embodiment as shown in FIG. 3, the control signal DR comprises a first control signal DR1 and a second control signal DR2 for respectively driving the first switch 1031 and the second switch 1032 on and off in complementary. The first switch 1031 can be referred to as a main switch in this example. When the first switch 1031 is turned on, the second switch 1032 is turned off. In this situation, the switch module 103 is considered as being switched on, enabling the power source voltage Vpwr to be coupled to the common connection SW, and then to be transmitted to the output port 102 via the output filter module 107, thereby providing a first current path from the input port 101 to the output port 102, and enabling the first switching current $I_{S1}$ flow through the first switch 1031 and the inductive power storage device Lo to transmit power from the input port 101 to the output port 102. When the first switch 1031 is turned off, the second switch 1032 is turned on. In this situation, the switch module 103 is considered as being switched off, thereby switching the power source voltage Vpwr off from the common connection SW. Thus, the first current path is cut off, disabling the first switching current $I_{S1}$ flow from the input port 101 to the switch module 103. But in the meanwhile, since the second switch 1032 is turned on, a second current path from the output port 102 to the ground pin GND is provided, enabling the second switching current $I_{S2}$ flow from the ground pin GND, through the resistive component Rpgnd, the second switch 1032 and the inductive power storage device Lo, to the output port 102. Actually, when the switch module 103 is switched on (i.e. the main switch 1031 is turned on and the second switch 1032 is turned off), the second switching current flowing through the resistive component Rpgnd is disabled. Therefore, during normal operation of the buck switching regulator circuit 200 shown in the example of FIG. 2, the switch module 103 may switch on and off periodically in response to the control signal DR, and the switching current (e.g. the switching current $I_{S2}$ shown in FIG. 2) flowing through the resistive component Rpgnd is also enabled and disabled periodically. In the exemplary buck switching regulator circuit of FIG. 2, the switching current (e.g. the second switching current $I_{S2}$) flowing through the resistive component Rpgnd is enabled with the off duty cycle 1−D of the switch module 103 (i.e. the off duty cycle 1−D of the main switch 1031), and is disabled with the on duty cycle D of the switch module 103 (i.e. the on duty cycle D of the main switch 1031). Thus, the first factor K1 for the buck switching regulator circuit 200 may be expressed by K1=Rpgnd*(1−D). The current flow through the inductive power storage device Lo may be referred to as an inductor current $I_L$. The inductor current $I_L$ actually substantially equals to the first switching current $I_{S1}$ during the on duty cycle D of the switch module 103 (i.e. the on duty cycle D of the main switch 1031), and substantially equals to the second switching current $I_{S2}$ during the off duty cycle 1−D of the switch module 103 (i.e. the off duty cycle 1−D of the main switch 1031).

According to an exemplary embodiment, still referring to FIG. 3. The control module 104 may comprise a first control module 201, a second control module 202 and a third control module 203.

The first control module 201 is configured to receive the first signal VFB and the first reference signal REF1, and configured to provide a difference signal $V_{COMP}$ indicative of the difference between the first signal VFB and the first reference signal REF1. The first control module 201 according to an exemplary embodiment may comprise a first operational amplifier A1 having a first amplifier input terminal configured to receive the first signal VFB, a second amplifier input terminal configured to receive the first reference signal REF1, and an amplifier output terminal configured to provide the difference signal $V_{COMP}$. A loop compensation module 205 may generally be coupled to the amplifier output terminal of the first operational amplifier A1 for loop stability compensation. In the example of FIG. 3, the loop compensation module 205 is illustrated as to comprise a compensation capacitor $C_C$ and a compensation resistor $R_C$ coupled in series between the amplifier output terminal and the ground pin GND. The loop compensation module 205 may not be integrated into the switching regulator circuit die packaged into the package 108, and may be provided by user as external components. The difference signal $V_{COMP}$ therefore is generated by compensating a difference between the first signal VFB and the first reference signal REF1 by the loop compensation module 205.

The second control module 202 is configured to receive the difference signal $V_{COMP}$ and a second signal $V_{SEN}$ indicative of the output current Io, and configured to provide a comparison signal PWM based on comparing the second signal $V_{SEN}$ with the difference signal $V_{COMP}$. The second control module 202 according to an exemplary embodiment may comprise a comparator having a first comparator input terminal configured to receive the second signal $V_{SEN}$, a second comparator input terminal configured to receive the difference signal $V_{COMP}$, and a comparator output terminal configured to provide the comparison signal PWM.

The third control module 203 is configured to receive the comparison signal PWM and a clock signal CLOCK, and configured to provide the control signal DR (the first control signal DR1 and the second control signal DR2) to the switch module 103, wherein the control signal DR turns the first switch 1031 off in response to the comparison signal PWM and turns the first switch 1031 on in response to the clock signal CLOCK. In an exemplary embodiment, the third control module 203 may comprise a logic circuit, such as a flip-flop logic circuit etc. In one embodiment, when the second signal $V_{SEN}$ is greater than the difference signal $V_{COMP}$, the control signal DR turns the first switch 1031 off in response to the comparison signal PWM, i.e. the comparison signal PWM is configured to trig the third control module 203 to turn off the first switch 1031 when the second signal $V_{SEN}$ is greater than the difference signal $V_{COMP}$. Otherwise, when the second signal $V_{SEN}$ is lower than the difference signal $V_{COMP}$, the control signal DR does not respond to the comparison signal PWM, i.e. the comparison signal PWM is configured not to trig the third control module 203 to turn off the first switch 1031 when the second signal $V_{SEN}$ is lower than the difference signal $V_{COMP}$.

In one embodiment, the second signal $V_{SEN}$ is provided through sensing the current $I_L$ flowing through the inductive power storage device Lo or through sensing the first switching current $I_{S1}$ flowing through the first switch 1031. Since the second signal $V_{SEN}$ indicates the output current Io, and is compared with the difference signal $V_{COMP}$ for controlling the switch off of power transmission from the input port 101 to the output port 102, the difference signal $V_{COMP}$ may be considered as a threshold limiting the peak value of the second signal $V_{SEN}$. Therefore, the difference signal $V_{COMP}$ also indicates the output current Io and may be deduced as substantially proportional to the output current Io with a factor K2. One having ordinary skill in the art can understand that the factor K2 may be determined and depend on circuit design and application specifications of the switching regulator circuit 200. Therefore, in an exemplary embodiment, the reference compensation signal CP1 may comprise the difference signal $V_{COMP}$. Providing the difference signal $V_{COMP}$ to the reference compensation module 105 as the reference compensation signal CP1 may advantageously save circuit components, simplify circuit design and reduce chip size and cost of the switching regulator circuit.

In one embodiment, the control module 104 may further comprise a current sense module 204 configured to sense the first switching current $I_{S1}$ and to provide the second signal $V_{SEN}$. The current sense module 204 may comprise a current sense resistor, a current sense amplifier or other current sensing circuit well known to those skilled in the art. In the exemplary embodiment shown in FIG. 3, the current sense module 204 is illustrated as to comprise a current sense resistor RS, and a current sense amplifier A2. The current sense resistor RS is coupled in series with the first switch 1031. The current sense amplifier A2 comprises a first amplifier input terminal coupled to a first end of the current sense resistor RS, a second amplifier input terminal coupled to a second end of the current sense resistor RS, and an amplifier output terminal configured to provide the second signal $V_{SEN}$.

For the buck (step down) switching regulator circuit 200, the average offset voltage Voffset is negative with respect to the ground pin GND due to the switching current (e.g. the second switching current $I_{S2}$ shown in FIG. 2) flowing through the resistive component Rpgnd in the direction from the ground pin GND to the output port 102. Therefore, referring back to the expression (1), it is desired that the reference compensation module 105 compensates the influence of the average offset voltage Voffset (reflected by the item K1*Io) to the first reference signal REF1 by adding the reference compensation signal CP1 (reflected by the item K4*K2*Io) to the second reference signal REF2 (reflected by the item K3*VBG). Thus, the superposing circuit 1053 of the reference compensation module 105 is configured to add the second compensation signal CP2 to the third reference signal REF3 for a buck (step down) switching regulator circuit such as the buck switching regulator circuit 200.

To provide an exemplary embodiment, continuing with FIG. 3, the difference signal $V_{COMP}$ is provided to the reference compensation module 105 as the reference compensation signal CP1. The voltage dividing circuit 1051 of the reference compensation module 105 may comprise a first resistor R1 and a second resistor R2; and the superposing circuit 1053 may comprise the first resistor R1, the second resistor R2 and a third resistor R3; wherein the first resistor R1 is coupled between the dividing input terminal of the voltage dividing circuit 1051 and a first node n1, the second resistor R2 is coupled between the first node n1 and a second node n2, and the third resistor R3 is coupled between the second node n2 and the reference ground PGND; and wherein the second compensation signal CP2 is provided to the second node n2; and wherein the first reference signal REF1 is provided from the first node n1 to the control module 104.

Figure 4A:
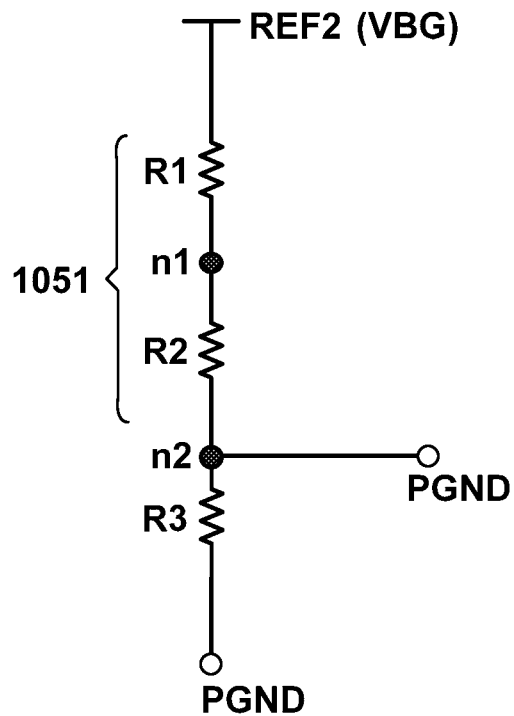
FIG. 4A illustrates an equivalent configuration of the voltage dividing circuit 1051 and the superposing circuit 1053 of the reference compensation module 105 in FIG. 3 when only the second reference signal is applied.
Figure 4B:
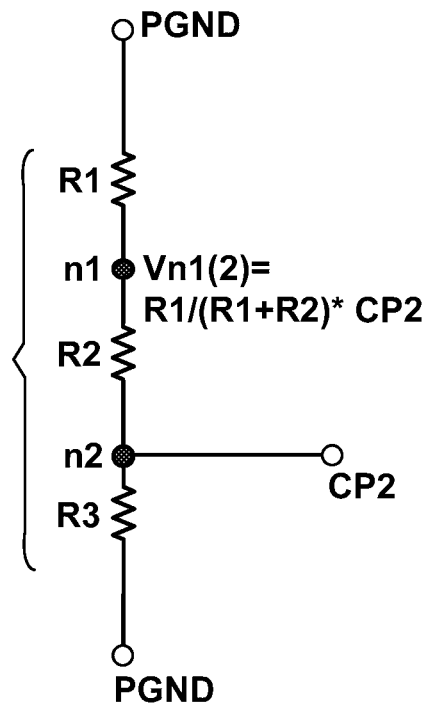
FIG. 4B illustrates an equivalent configuration of the voltage dividing circuit 1051 and the superposing circuit 1053 of the reference compensation module 105 in FIG. 3 when only the second compensation signal is applied.

According to the superposition theorem, the first reference signal REF1 referenced to the reference ground PGND may be obtained by superposing the second reference signal REF2 and the second compensation signal CP2 at the first node n1, and may be expressed by Vn1=Vn1(1)+Vn1(2), wherein Vn1(1) represents the voltage at the first node n1 when only the second reference signal REF2 is applied, and wherein Vn1(2) represents the voltage at the first node n1 when only the second compensation signal CP2 is applied. Thus, the first node n1 may be considered as the first superposing input terminal as well as the superposing output terminal of the superposing circuit 1053, the second node n2 may be considered as the second superposing input terminal of the superposing circuit 1053. FIG. 4A illustrates the equivalent configuration of the voltage dividing circuit 1051 and the superposing circuit 1053 when only the second reference signal REF2 is applied, the signal Vn1(1) can be expressed by Vn1(1)=R2/(R1+R2)*VBG. The signal Vn1(1) actually acts as the third reference signal REF3 provided by the voltage dividing circuit 1051, which implies that the third factor K3 can be determined by the ratio R2/(R1+R2). The first node n1 may then be considered as the dividing output terminal of the voltage dividing circuit 1051. FIG. 4B illustrates the equivalent configuration of the voltage dividing circuit 1051 and the superposing circuit 1053 when only the second compensation signal CP2 is applied, the signal Vn1(2) can be expressed by Vn1(2)=R1/(R1+R2)*CP 2=R1/(R1+R2)*K4*K2*Io. The first reference signal REF1 referenced to the ground pin GND may then be expressed as:

$$REF1 = Vn1(1) + Vn1(2) - Voffset \quad (2)$$
$$= R2/(R1+R2)*VBG + R1/(R2)*K4*K2*Io - K1*Io$$

In the above expression (2) of the first reference signal REF1 with respect to the ground pin GND, the first factor K1, the second factor K2 and the third factor K3=R2/(R1+R2) may be determined according to application and circuit design requirements of the buck switching regulator circuit 200. Therefore, it may be feasible to set the fourth factor K4 appropriately so as to cancel out the item K1*Io by the item R1/(R1+R2)*K4*K2*Io, thereby substantially cancelling out the average offset voltage Voffset by the reference compensation signal CP1 (i.e. K2*Io) from the first reference signal REF1 with respect to the ground pin GND.

Figure 5:
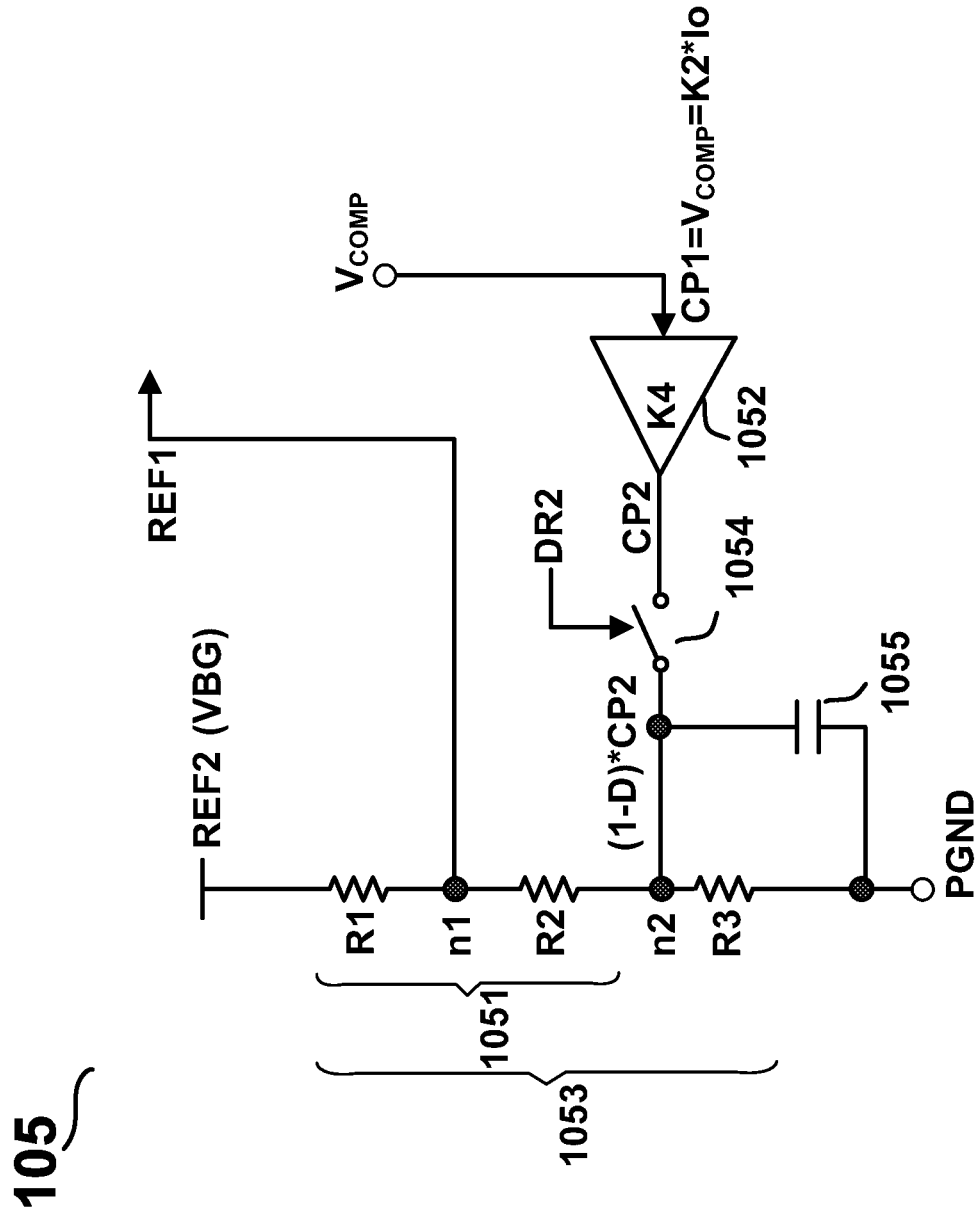
FIG. 5 illustrates a schematic diagram of a reference compensation module 105 according to an alternative exemplary embodiment that can be used in the switching regulator circuit 200.

FIG. 5 illustrates a schematic diagram of a reference compensation module 105 according to an alternative exemplary embodiment that can be used in the switching regulator circuit 200. Components or structures in the reference compensation module 105 shown in FIG. 5 with substantially the same functions as those of the reference compensation module 105 shown in FIG. 3 are identified by the same reference labels for the sake of simplicity. Similar as the reference compensation module illustrated in FIG. 2, the reference compensation module 105 of FIG. 5 further comprises a controllable pass device 1054 coupled between the buffer output terminal of the gain buffer 1052 and the second node n2 (the second superposing input terminal) of the superposing circuit 1053. The controllable pass device 1054 of FIG. 5 may have the same configuration and function as that of FIG. 2, and thus is not described in detail again herein. What is particular is that the switch control terminal of the pass device 1054 of FIG. 5 may be configured to receive the second control signal DR2, wherein the second control signal DR2 drives the pass device 1054 on and off in synchronous with the on and off of the second switch 1032. In this way, the pass device 1054 may be able to transmit the second compensation signal CP2 to the second superposing input terminal of the superposing circuit 1053 only during the period when the switching current (e.g. the second switching current $I_{S2}$ in FIG. 2) flowing through the resistive component Rpgnd is enabled. Thus, the reference compensation module 105 of FIG. 5 may be able to compensate the influence of the average offset voltage Voffset in the buck switching regulator circuit 200 with the 1–D duty cycle information (the duty cycle of the switching current flow through the resistive component Rpgnd is enabled), which advantageously improves the compensation precision. In one embodiment, the reference compensation module 105 shown in FIG. 5 may optionally further comprise a noise filter (e.g. a capacitor) 1055 coupled between the second switch terminal of the pass device 1054 and the reference ground PGND. The noise filter 1055 is configured to smooth the second compensation signal CP2 transmitted to the second superposing input terminal and may advantageously help to decrease the switching noise of the pass device 1054 transmitted to the superposing circuit 1053.

The switching regulator circuits 200 and the reference compensation modules 105 described with reference to FIGS. 3-5 are based on buck (step down) converter topology. One having ordinary skill in the art would understand that the circuit elements and configuration of the switching regulator circuits 200 and the reference compensation modules 105 of FIGS. 3-5 are illustrated and mentioned for purpose of providing better understanding only and should not be interpreted as limitations. The switching regulator circuit may in other possible embodiments comprise other circuit elements and have other configuration, e.g. may base on other converter topology such as boost (step-up) type or buck-boost type etc. The reference compensation module in other possible embodiments may also comprise other circuit elements and have other configuration.

Figure 6:
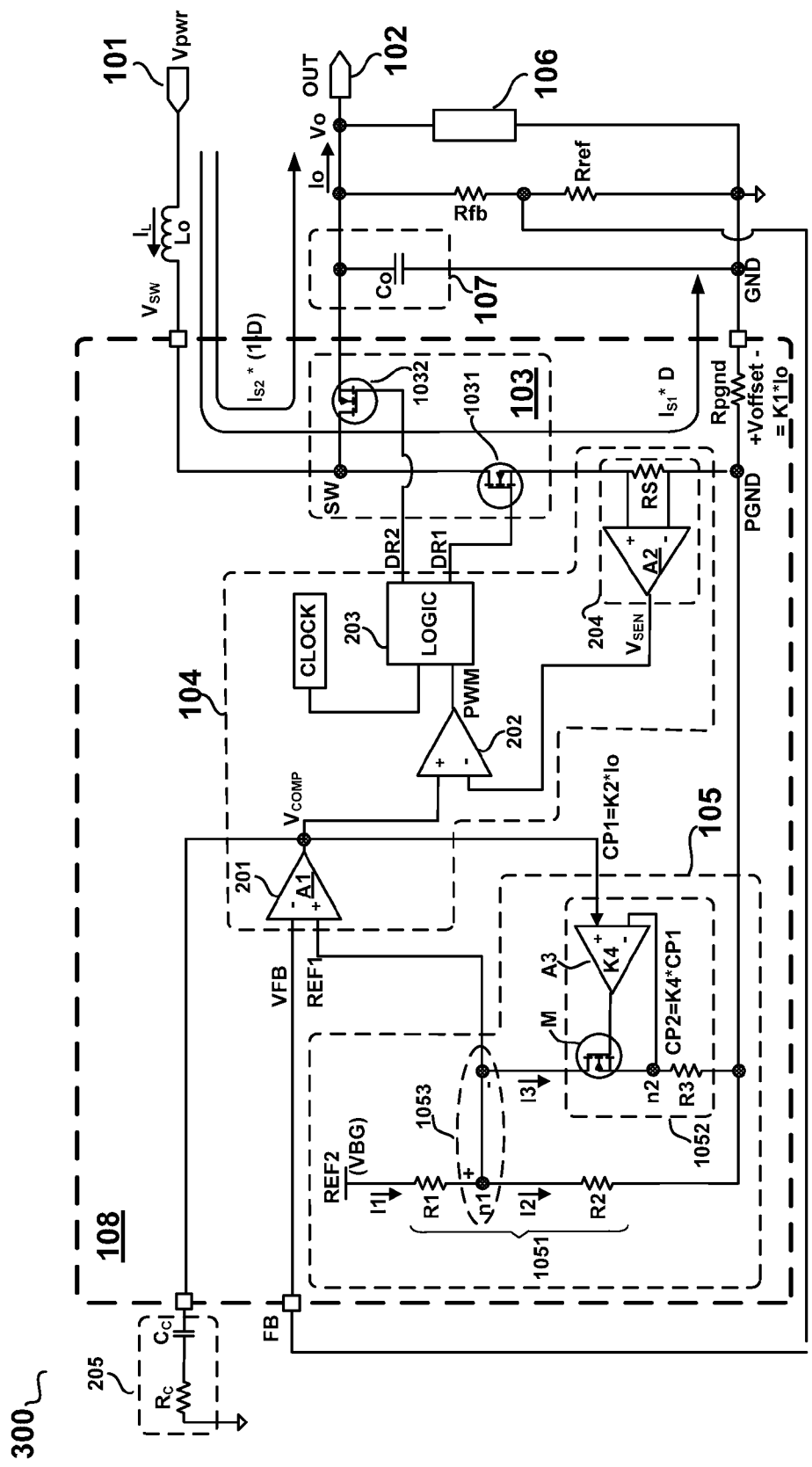
FIG. 6 illustrates a block diagram of a switching regulator circuit 300 in accordance with an embodiment of the present invention.

FIG. 6 illustrates a block diagram of a switching regulator circuit 300 in accordance with an embodiment of the present invention. Components or structures in the switching regulator circuit 300 with substantially the same functions as those of the switching regulator circuit 100 and 200 described previously with reference to FIGS. 1-5 are identified by the same reference labels for the sake of simplicity. Similar as in the switching regulator circuit 200, in the exemplary switching regulator circuit 300, the switch module 103 is still illustrated as to comprise a first switch 1031 (main switch) and a second switch 1032. The first switch 1031 has a first terminal coupled to the input port 101 via an inductive power storage device Lo, a second terminal coupled to the reference ground PGND, and a control terminal configured to receive the first control signal DR1. The second switch 1032 has a first terminal coupled to the first terminal of the first switch 1031, forming a common connection SW, a second terminal coupled to the output port 102 via the output filter module 107, and a control terminal configured to receive the second control signal DR2. In this exemplary embodiment, the switching regulator circuit 300 is illustrated as based on boost (step up) type converter topology and may be referred to as a boost (step up) switching regulator circuit.

In the exemplary embodiment as shown in FIG. 6, the output filter module 107 is illustrated as an example to comprise a capacitive power storage device Co (e.g. an output capacitor Co) coupled between the output port 102 and the package ground pin GND.

In the exemplary embodiment as shown in FIG. 6, the first control signal DR1 and the second control signal DR2 are configured to drive the first switch 1031 and the second switch 1032 on and off complementarily. The first switch 1031 can be referred to as a main switch. When the first switch 1031 is turned on, the second switch 1032 is turned off. In this situation, the switch module 103 is considered as being switched on, providing a first current path from the input port 101 to the ground pin GND, and enabling the first switching current $I_{S1}$ flow from the input port 101, through the inductive power storage device Lo, the first switch 1031 and the resistive component Rpgnd, to the ground pin GND. When the first switch 1031 is turned off, the second switch 1032 is turned on. In this situation, the switch module 103 is considered as being switched off, and the first current path is cut off, disabling the first switching current $I_{S1}$ through the resistive component Rpgnd. In the meanwhile, a second current path from the input port 101 to the output port 102 is formed, enabling the second switching current $I_{S2}$ flow from the input port 101, through the second switch 1032 and the output filter module 107, to the output port 102. Therefore, in the exemplary boost switching regulator circuit of FIG. 6, the switching current (e.g. the first switching current $I_{S1}$) flowing through the resistive component Rpgnd is enabled with the on duty cycle D of the switch module 103 (i.e. the on duty cycle D of the main switch 1031), and is disabled with the off duty cycle 1–D of the switch module 103 (i.e. the off duty cycle 1–D of the main switch 1031). Thus, the first factor K1 for the boost switching regulator circuit 300 may be expressed by K1=Rpgnd*D.

According to the exemplary embodiment illustrated in FIG. 6, the control module 104 of the boost switching regulator circuit 300 may still comprise a first control module 201, a second control module 202 and a third control module 203. The first control module 201, the second control module 202 and the third control module 203 may have the same configuration and function as previously described with reference to FIG. 3. With the similar reasons stated previously with reference to the switching regulator circuit 200, the difference signal $V_{COMP}$ provided by the first control module 201 may be deduced as substantially proportional to the output current Io with a factor K2, and may be provided to the reference compensation module 105 as the reference compensation signal CP1 in one embodiment. One having ordinary skill in the art can understand that the factor K2 may be determined and depend on circuit design and application specifications of the switching regulator circuit 300.

In one embodiment, the control module 104 of the boost switching regulator circuit 300 may also further comprise a current sense module 204. The current sense module 204 is configured to sense the first switching current $I_{S1}$ to provide the second signal $V_{SEN}$. The current sense module 204 may comprise a current sense resistor, a current sense amplifier or other current sensing circuit well known to those skilled in the art. In the exemplary embodiment shown in FIG. 6, the current sense module 204 is illustrated as to comprise a current sense resistor RS, and a current sense amplifier A2. The current sense resistor RS is coupled in series with the first switch 1031. The current sense amplifier A2 comprises a first amplifier input terminal coupled to a first end of the current sense resistor RS, a second amplifier input terminal coupled to a second end of the current sense resistor RS, and an amplifier output terminal configured to provide the second signal $V_{SEN}$. Since the current sense module 204 of the boost switching regulator circuit 300 of FIG. 6 senses the first switching current $I_{S1}$, which flows through the resistive component Rpgnd, the second signal $V_{SEN}$ may also be provided to the reference compensation module 105 as the reference compensation signal CP1 in an alternative embodiment.

For the boost (step up) switching regulator circuit 300, the average offset voltage Voffset is positive with respect to the ground pin GND due to the switching current (e.g. the first switching current $I_{S1}$ shown in FIG. 6) flowing through the resistive component Rpgnd in the direction from the input port 101 to the ground pin GND. Therefore, referring back to the expression (1), it is desired that the reference compensation module 105 compensates the influence of the average offset voltage Voffset (reflected by the item K1*Io) to the first reference signal REF1 by subtracting the reference compensation signal CP1 (reflected by the item K4*K2*Io) to the second reference signal REF2 (reflected by the item K3*VBG). Thus, the superposing circuit 1053 of the reference compensation module 105 is configured to subtract the second compensation signal CP2 from the third reference signal REF3 for a boost (step up) switching regulator circuit such as the boost switching regulator circuit 300.

To provide an exemplary embodiment, continuing with FIG. 6, the difference signal $V_{COMP}$ is provided to the reference compensation module 105 as the reference compensation signal CP1. In this example, the voltage dividing circuit 1051 of the reference compensation module 105 may comprise a first resistor R1 and a second resistor R2, wherein the first resistor R1 is coupled between the dividing input terminal of the voltage dividing circuit 1051 and a first node n1, the second resistor R2 is coupled between the first node n1 and the reference ground PGND. The gain buffer 1052 may comprise a gain amplifier A3 having a gain K4, a transistor M and a third resistor R3, wherein the gain amplifier A3 comprises a first input terminal configured to receive the reference compensation signal CP1, a second input terminal coupled to a second node n2, and an output terminal; and wherein the transistor M may comprise a first terminal coupled to the first node n1, a second terminal coupled to the second node n2, and a control terminal coupled to the output terminal of the gain amplifier A3; and wherein the third resistor R3 may have a first terminal coupled to the second node n2, and a second terminal coupled to the reference ground PGND. The superposing circuit 1053 may comprise the first node n1. The second compensation signal CP2 is provided to the second node n2. The first reference signal REF1 is provided from the node n1 to the control module 104.

Figure 7:
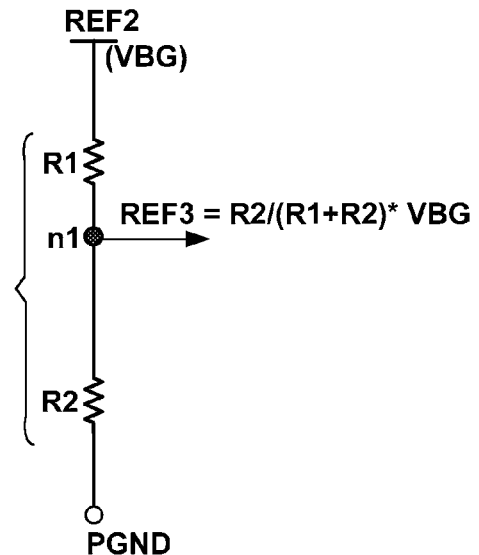
FIG. 7 illustrates a schematic diagram of the reference compensation module 105 of FIG. 6 without the gain buffer 1052 when only the second reference signal is applied to the voltage dividing circuit 1051.

Now referring to FIG. 7, supposing only the second reference signal REF2 is applied to the voltage dividing circuit 1051 and the gain buffer 1052 does not exist, the voltage at the first node n1 in this case should be Vn1(1)=R2/(R1+R2)*VBG. The signal Vn1(1) actually acts as the third reference signal REF3 provided by the voltage dividing circuit 1051, which implies that the third factor K3 can be determined by the ratio R2/(R1+R2). The first node n1 may then be considered as the dividing output terminal of the voltage dividing circuit 1051.

Referring back to FIG. 6, when the gain buffer 1052 is added, a third current I3 is drawn from the first node n1, wherein the third current I3=CP2/R3. In this case, supposing the voltage at the first node n1 is Vn1 referenced to the reference ground PGND. A first current flowing through the first resistor R1 may be expressed by I1=(VBG−Vn1)/R1, according to the KCL at the first node n1, a second current I2 flowing through the second resistor R2 may be obtained by subtracting the third current I3 from the first current I1 flowing through the first resistor R1, i.e. I2=I1−I3. The voltage Vn1 actually is also the voltage across the second resistor R2 resulted by the current I2 flowing through the second resistor R2, and can be expressed by I2*R2. It can then be deduced that the voltage Vn1 may be expressed by Vn1=K3*VBG−R1*R2/(R1+R2)*CP2/R3. Therefore, subtraction between an item (K3*VBG) indicative of the third reference signal REF3 and an item (R1*R2/(R1+R2)*CP2/R3) indicative of the second compensation signal CP2 is realized at the first node n1, and the first node n1 is considered as the superposing circuit 1053. Thus, the first node n1 may function as the first superposing input terminal, the second superposing input terminal and the superposing output terminal of the superposing circuit 1053. The first reference signal REF1 referenced to the ground pin GND may then be expressed as:

$$REF1 = Vn1 + Voffset \quad (3)$$
$$= R2/(R1+R2)*VBG - R1*R2/(R1+R2)/R3*K4*K2*Io + K1*Io$$

From the above expression (3) of the first reference signal REF1 with respect to the ground pin GND, it can be seen that it may be feasible to set the fourth factor K4 and the resistance of the third resistor R3 appropriately so as to cancel out the item K1*Io by the item R1*R2/(R1+R2)/R3*K4*K2*Io, thereby substantially cancelling out the average offset voltage Voffset by the reference compensation signal CP1 (i.e. K2*Io) from the first reference signal REF1 with respect to the ground pin GND.

Figure 8:
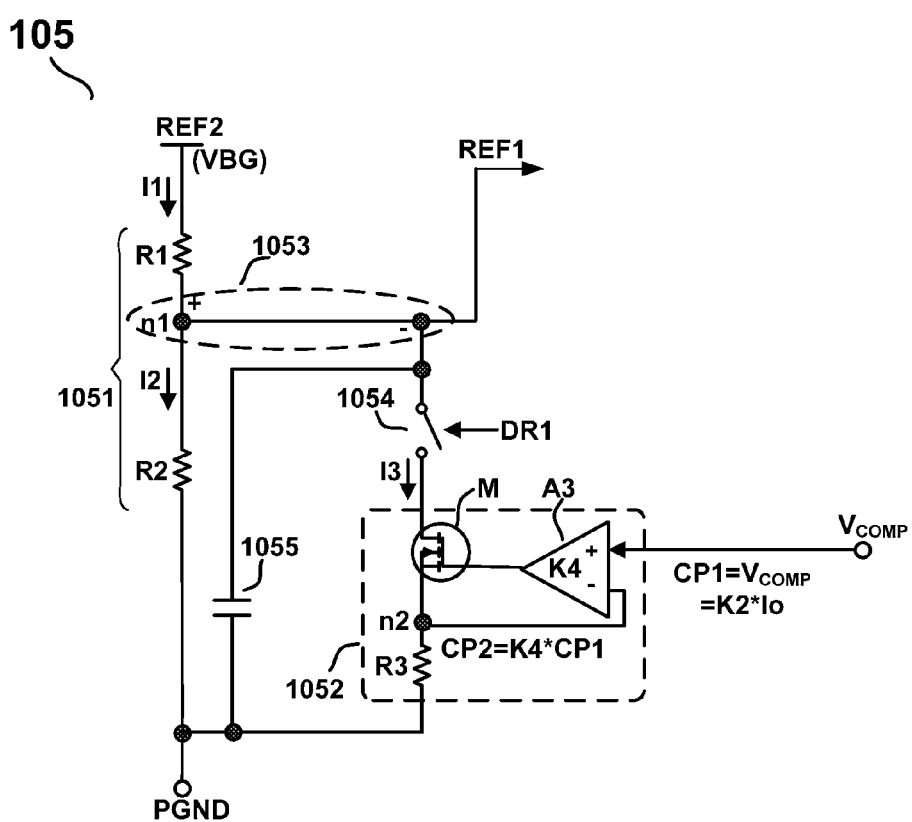
FIG. 8 illustrates a schematic diagram of a reference compensation module 105 according to an alternative exemplary embodiment that can be used in the switching regulator circuit 300.

FIG. 8 illustrates a schematic diagram of a reference compensation module 105 according to an alternative exemplary embodiment that can be used in the switching regulator circuit 300. Components or structures in the reference compensation module 105 shown in FIG. 8 with substantially the same functions as those of the reference compensation module 105 shown in FIG. 6 are identified by the same reference labels for the sake of simplicity. The reference compensation module 105 of FIG. 8 further comprises a controllable pass device 1054 coupled between the first terminal of the transistor M (considered as the buffer output terminal of the gain buffer 1052) and the first node n1 of the superposing circuit 1053. The controllable pass device 1054 of FIG. 8 may have the same configuration and function as that of FIG. 2, and thus is not described in detail again herein. What is particular is that the switch control terminal of the pass device 1054 of FIG. 8 may be configured to receive the first control signal DR1, wherein the first control signal DR1 drives the pass device 1054 on and off in synchronous with the on and off of the first switch 1031 to bring the on duty cycle D into the item indicative of the second compensation signal CP2. Thus, the influence of the average offset voltage Voffset to the first reference signal REF1 may be more precisely compensated by the reference compensation signal CP1. In one embodiment, the reference compensation module 105 shown in FIG. 8 may optionally further comprise a noise filter (e.g. a capacitor) 1055 coupled between the second switch terminal of the pass device 1054 and the reference ground PGND. The noise filter 1055 is configured to smooth the second compensation signal CP2 transmitted to the second superposing input terminal and may advantageously help to decrease the switching noise of the pass device 1054 transmitted to the superposing circuit 1053.

Figure 9:
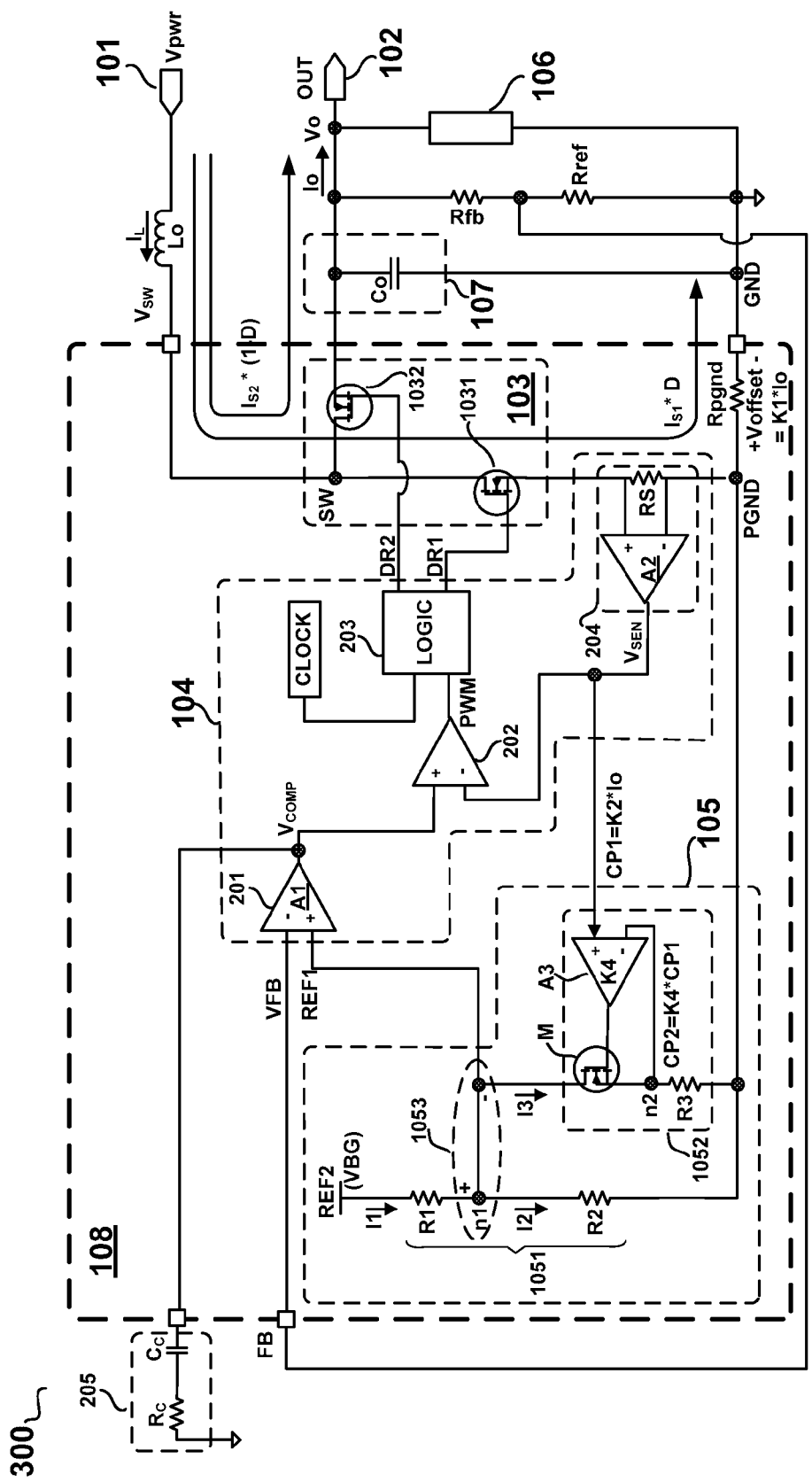
FIG. 9 illustrates a block diagram of the switching regulator circuit 300 in accordance with an alternative embodiment of the present invention.

FIG. 9 illustrates a block diagram of the switching regulator circuit 300 in accordance with an alternative embodiment of the present invention. In this exemplary embodiment, the second signal $V_{SEN}$ is alternatively provided to the reference compensation module 105 as the reference compensation signal CP1. Since the current sense module 204 senses the first switching current $I_{S1}$ to provide the second signal $V_{SEN}$ for the boost switching regulator circuit 300, the second signal $V_{SEN}$ actually already comprises the on duty cycle D information. Thus, more precise compensation results may be obtained by providing the second signal $V_{SEN}$ as the reference compensation signal CP1 to compensate the average offset voltage Voffset, which is due to the first switching current $I_{S1}$ flowing through the resistive component Rpgnd with the on duty cycle D. In this case, if the relationship between the second signal $V_{SEN}$ and the output current Io is substantially expressed by $V_{SEN}$=K2*Io, the second factor K2 actually carries the duty cycle D information.

In the exemplary embodiment of FIG. 9, the reference compensation module 105 may have substantially the same components, structures and operating principles as the reference compensation module 105 described with reference to FIG. 6, and thus is not described in detain again herein. However, one having ordinary skill in the art will understand that component parameters such as resistance of the first, second and third resistors R1, R2 and R3 and the gain K4 of the gain amplifier A3 etc. may be different, and may be appropriately chosen for optimizing the compensation to the influence of the average offset voltage Voffset to the first reference signal REF1 with respect to the ground pin GND.

Figure 10:
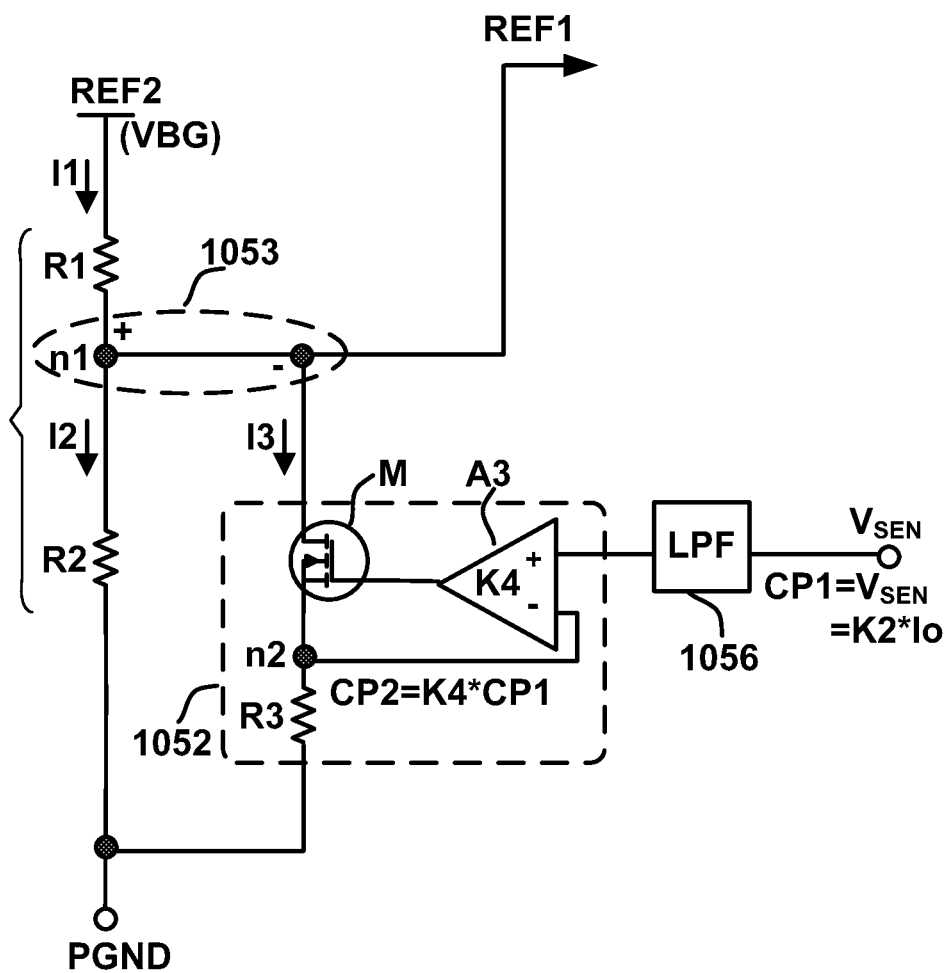
FIG. 10 illustrates a schematic diagram of a reference compensation module 105 according to an alternative exemplary embodiment that can be used in the switching regulator circuit 300 of FIG. 9.

FIG. 10 illustrates a schematic diagram of a reference compensation module 105 according to another exemplary embodiment that can be used in the switching regulator circuit 300. Components or structures in the reference compensation module 105 shown in FIG. 10 with substantially the same functions as those of the reference compensation module 105 shown in FIG. 9 are identified by the same reference labels for the sake of simplicity. The reference compensation module 105 of FIG. 10 optionally further comprises a low pass filter (LPF) 1056 coupled between the buffer input terminal (e.g. the first input terminal of the gain amplifier A3) of the gain buffer 1052 and the output terminal of the current sense module 204. The low pass filter 1056 is configured to receive the second signal $V_{SEN}$ from the output terminal of the current sense module 204 and to provide an average signal of the second signal $V_{SEN}$ (i.e. the reference compensation signal CP1) to the buffer input terminal of the gain buffer 1052.

In accordance with the various embodiments described with reference to FIG. 1 to FIG. 10, the switching regulator circuits 100, 200, and 300 comprise a reference compensation module 105. The reference compensation module 105 may be able to compensate the influence of the offset voltage Voffset to the first reference signal REF1, which is used for regulating the output voltage Vo, thereby improving the load regulation performance of the switching regulator circuits. The reference compensation module 105 in accordance with various embodiments of the present invention may be configured to receive a reference compensation signal CP1 proportional to the output current Io, and to compensate the first reference signal REF1 with the reference compensation signal CP1 so as to substantially cancel out the average offset voltage Voffset from the first reference signal REF1 with respect to the package ground pin GND. The reference compensation signal CP1 may be provided from existing internal circuits/modules (such as the first control module 201 and the current sense module 204 in the exemplary embodiments described above) in the switching regulator circuits 100, 200, and 300. Therefore, the switching regulator circuits in accordance with various embodiments of the present invention may achieve high load regulation performance without using expensive extra ground pin or extra flip-chip ground bond pad, and without adding more extra internal circuit/module for implementing the first reference signal REF1 compensation (i.e. load regulation compensation), saving cost and size of the switching regulator circuits.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A switching regulator circuit, comprising:
an input port configured to receive a power source voltage;
an output port configured to provide an output voltage and an output current;
a reference ground connected to a package ground pin via a resistive component, wherein the reference ground has an average offset voltage with respect to the package ground pin, and wherein the average offset voltage is proportional to the output current with a first factor;

a switch module having a first terminal coupled to the input port, a second terminal coupled to the output port, a third terminal coupled to the reference ground, and a fourth terminal configured to receive a control signal, wherein the switch module is configured to switch on and off periodically in response to the control signal to convert the power source voltage into the output voltage;

a control module configured to receive a first signal indicative of the output voltage and a first reference signal indicative of a desired output voltage value, and configured to provide the control signal to the switch module based on the first signal and the first reference signal; and a reference compensation module configured to receive a second reference signal having a bandgap reference voltage with respect to the reference ground and a reference compensation signal proportional to the output current with a second factor, and configured to provide the first reference signal based on compensating the second reference signal with the reference compensation signal to substantially cancel out the average offset voltage from the first reference signal with respect to the ground pin.

2. The switching regulator circuit of claim 1, wherein the reference compensation module comprises:

a voltage dividing circuit having a dividing input terminal and a dividing output terminal, wherein the dividing input terminal is configured to receive the second reference signal, and the dividing output terminal is configured to divide the second reference signal with a third positive factor so as to generate a third reference signal proportional to the second reference signal with the third factor;

a gain buffer having a buffer input terminal and a buffer output terminal, wherein the buffer input terminal is configured to receive the reference compensation signal, and wherein the gain buffer is configured to apply a gain to the reference compensation signal to provide a second compensation signal proportional to the reference compensation signal with a fourth factor at the buffer output terminal; and a superposing circuit having a first superposing input terminal, a second superposing input terminal and a superposing output terminal, wherein the first superposing input terminal is configured to receive the third reference signal, the second superposing input terminal is configured to receive the second compensation signal, and the superposing circuit is configured to superpose the second compensation signal to the third reference signal to generate the first reference signal at the superposing output terminal.

3. The switching regulator circuit of claim 2, wherein the switch module is further configured to enable and disable a switching current flow through the resistive component, and wherein the switching current flow through the resistive component results in the average offset voltage, and wherein the reference compensation module further comprises:

a controllable pass device, coupled between the buffer output terminal and the second superposing input terminal; and wherein the controllable pass device is configured to transmit the second compensation signal to the second superposing input terminal during the period when the switching current flow through the resistive component is enabled.

4. The switching regulator circuit of claim 3, wherein the reference compensation module further comprises:

a noise filter coupled between the second superposing input terminal and the reference ground; and wherein the noise filter is configured to smooth the second compensation signal transmitted to the second superposing input terminal.

5. The switching regulator circuit of claim 2, wherein the switching regulator circuit is a step down switching regulator circuit; and wherein the average offset voltage is negative with respect to the ground pin; and wherein the control module comprises an operational amplifier configured to receive the first signal and the first reference signal, and configured to provide a difference signal indicative of the difference between the first signal and the first reference signal, wherein the difference signal is proportional to the output current; and wherein the reference compensation signal comprises the difference signal; and wherein the superposing circuit is configured to superpose the second compensation signal to the third reference signal by adding the second compensation signal to the third reference signal to generate the first reference signal.

6. The switching regulator circuit of claim 5, wherein the voltage dividing circuit comprises a first resistor and a second resistor; and the superposing circuit comprises the first resistor, the second resistor and a third resistor; and wherein the first resistor is coupled between the dividing input terminal of the voltage dividing circuit and a first node;

the second resistor is coupled between the first node and a second node; and the third resistor is coupled between the second node and the reference ground; and wherein the second compensation signal is provided to the second node; and wherein the first reference signal is generated from the first node to the control module.

7. The switching regulator circuit of claim 2, wherein the switching regulator circuit is a step up switching regulator circuit; and wherein the average offset voltage is positive with respect to the ground pin; and wherein the control module comprises an operational amplifier configured to receive the first signal and the first reference signal, and configured to provide a difference signal indicative of the difference between the first signal and the first reference signal, wherein the difference signal is proportional to the output current; and wherein the reference compensation signal comprises the difference signal; and wherein the superposing circuit is configured to superpose the second compensation signal to the third reference signal by subtracting the second compensation signal from the third reference signal to generate the first reference signal.

8. The switching regulator circuit of claim 7, wherein the voltage dividing circuit comprises a first resistor and a second resistor, wherein the first resistor is coupled between the dividing input terminal of the voltage dividing circuit and a first node, and wherein the second resistor is coupled between the first node and the reference ground;

the gain buffer comprises a gain amplifier having a gain of the fourth factor, a transistor and a third resistor; wherein the gain amplifier comprises a first input terminal configured to receive the reference compensation signal, a second input terminal coupled to a second node, and an output terminal; and wherein the transistor comprises a first terminal coupled to the first node, a second terminal coupled to the second node, and a control terminal coupled to the output terminal of the gain amplifier; and wherein the third resistor has a first terminal coupled to the second node, and a second terminal coupled to the reference ground; and the superposing circuit comprises the first node; and wherein the second compensation signal is provided to the second node; and wherein the first reference signal is generated from the first node to the control module.

9. The switching regulator circuit of claim 2, wherein the switching regulator circuit is a step up switching regulator circuit; and wherein the average offset voltage is positive with respect to the ground pin; and wherein the control module comprises a current sense module configured to sense a switching current flowing through the resistive component and configured to provide a current sense signal proportional to the switching current flowing through the resistive component at a sense output terminal; and wherein the reference compensation signal comprises the current sense signal; and wherein the superposing circuit is configured to superpose the second compensation signal to the third reference signal by subtracting the second compensation signal from the third reference signal to generate the first reference signal.

10. The switching regulator circuit of claim 9, wherein the voltage dividing circuit comprises a first resistor and a second resistor, wherein the first resistor is coupled between the dividing input terminal of the voltage dividing circuit and a first node, and wherein the second resistor is coupled between the first node and the reference ground;

the gain buffer comprises a gain amplifier having a gain of the fourth factor, a transistor and a third resistor; wherein the gain amplifier comprises a first input terminal configured to receive the reference compensation signal, a second input terminal coupled to a second node, and an output terminal; and wherein the transistor comprises a first terminal coupled to the first node, a second terminal coupled to the second node, and a control terminal coupled to the output terminal of the gain amplifier; and wherein the third resistor has a first terminal coupled to the second node, and a second terminal coupled to the reference ground; and the superposing circuit comprises the first node; and wherein the second compensation signal is provided to the second node; and wherein the first reference signal is generated from the first node to the control module.

11. The switching regulator circuit of claim 9, wherein reference compensation module further comprises:

a low pass filter, coupled between the buffer input terminal and the sense output terminal, and wherein the low pass filter is configured to receive the second signal and to provide an average signal of the second signal to the buffer input terminal.

12. A reference compensation module for a switching regulator circuit, wherein the switching regulator circuit has a reference ground having an average offset voltage referred to a package ground pin, and wherein the average offset voltage is proportional to an output current of the switching regulator circuit with a first factor, and wherein the reference compensation module comprises:

a first input terminal configured to receive a second reference signal having a bandgap reference voltage with respect to the reference ground;

a second input terminal configured to receive a reference compensation signal proportional to the output current with a second factor; and an output terminal configured to provide a first reference signal based on compensating the second reference signal with the reference compensation signal to substantially cancel out the average offset voltage from the first reference signal with respect to the ground pin.

13. The reference compensation module of claim 12 further comprises:

a voltage dividing circuit having a dividing input terminal and a dividing output terminal, wherein the dividing input terminal is configured to receive the second reference signal, and the dividing output terminal is configured to divide the second reference signal with a third positive factor so as to generate a third reference signal proportional to the second reference signal with the third factor;

a gain buffer having a buffer input terminal and a buffer output terminal, wherein the buffer input terminal is configured to receive the reference compensation signal, and wherein the gain buffer is configured to apply a gain to the reference compensation signal to provide a second compensation signal proportional to the reference compensation signal with a fourth positive factor at the buffer output terminal; and a superposing circuit having a first superposing input terminal, a second superposing input terminal and a superposing output terminal, wherein the first superposing input terminal is configured to receive the third reference signal, the second superposing input terminal is configured to receive the second compensation signal, and the superposing circuit is configured to superpose the second compensation signal to the third reference signal to generate the first reference signal at the superposing output terminal.

14. The switching regulator circuit of claim 13, wherein the average offset voltage is resulted from a switching current flowing through a resistive component coupled between the reference ground and the ground pin; and wherein the reference compensation module further comprises:

a controllable pass device, coupled between the buffer output terminal and the second superposing input terminal; and wherein the controllable pass device is configured to transmit the second compensation signal to the second superposing input terminal during the period when the switching current flows through the resistive component.

15. The reference compensation module of claim 13, wherein the reference compensation module further comprises:

a noise filter coupled between the second superposing input terminal and the reference ground; and wherein the noise filter is configured to smooth the second compensation signal transmitted to the second superposing input terminal.

16. The reference compensation module of claim 13, wherein the first factor is negative; and wherein the superposing circuit is configured to superpose the second compensation signal to the third reference signal by adding the second compensation signal to the third reference signal to generate the first reference signal.

17. The reference compensation module of claim 13, wherein the first factor is positive; and wherein the superposing circuit is configured to superpose the second compensation signal to the third reference signal by subtracting the second compensation signal from the third reference signal to generate the first reference signal.

18. The reference compensation module of claim 13, wherein the first factor is negative; and wherein the voltage dividing circuit comprises a first resistor and a second resistor; and the superposing circuit comprises the first resistor, the second resistor and a third resistor; and wherein the first resistor is coupled between the dividing input terminal of the voltage dividing circuit and a first node;

the second resistor is coupled between the first node and a second node; and the third resistor is coupled between the second node and the reference ground; and wherein the second compensation signal is provided to the second node; and wherein the first reference signal is generated from the first node to the control module.

19. The reference compensation module of claim 13, wherein the first factor is positive; and wherein the voltage dividing circuit comprises a first resistor coupled between the dividing input terminal of the voltage dividing circuit and a first node, and a second resistor coupled between the first node and the reference ground;

the gain buffer comprises a gain amplifier having a gain of the fourth factor, a transistor and a third resistor; wherein the gain amplifier comprises a first input terminal configured to receive the reference compensation signal, a second input terminal coupled to a second node, and an output terminal; and wherein the transistor comprises a first terminal coupled to the first node, a second terminal coupled to the second node, and a control terminal coupled to the output terminal of the gain amplifier; and wherein the third resistor has a first terminal coupled to the second node, and a second terminal coupled to the reference ground; and the superposing circuit comprises the first node; and wherein the second compensation signal is provided to the second node; and wherein the first reference signal is generated from the first node to the control module.

* * * * *